United States Patent
Johnson et al.

(10) Patent No.: US 9,395,196 B2
(45) Date of Patent: Jul. 19, 2016

(54) METHOD AND SYSTEM OF USING TURN-BY-TURN SERVER BASED REROUTES DATA TO IMPROVE A NAVIGATION USER INTERFACE

(75) Inventors: Richard A. Johnson, Rochester Hills, MI (US); Steven C. Tengler, Grosse Pointe Park, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 2416 days.

(21) Appl. No.: 12/165,159

(22) Filed: Jun. 30, 2008

(65) Prior Publication Data
US 2009/0326801 A1   Dec. 31, 2009

(51) Int. Cl.
G01C 21/00 (2006.01)
G01C 21/30 (2006.01)
G01C 21/32 (2006.01)
G01C 21/34 (2006.01)

(52) U.S. Cl.
CPC .................. G01C 21/3415 (2013.01)

(58) Field of Classification Search
CPC .................................... G01C 21/3415
USPC ......................................... 701/201
See application file for complete search history.

(56) References Cited

U.S. PATENT DOCUMENTS

| | | | | |
|---|---|---|---|---|
| 5,272,638 A * | 12/1993 | Martin et al. | .............. | 455/456.5 |
| 5,369,588 A * | 11/1994 | Hayami et al. | ........... | 340/995.19 |
| 5,406,490 A * | 4/1995 | Braegas | ........................ | 701/210 |
| 5,467,276 A * | 11/1995 | Tsuyuki | ........................ | 701/207 |
| 5,818,356 A * | 10/1998 | Schuessler | ............... | 340/995.12 |
| 5,878,368 A * | 3/1999 | DeGraaf | ........................ | 701/209 |
| 5,890,085 A * | 3/1999 | Corrado et al. | ................. | 701/47 |
| 5,892,463 A * | 4/1999 | Hikita et al. | ............. | 340/995.13 |
| 5,906,654 A * | 5/1999 | Sato | .............................. | 701/210 |
| 5,911,773 A * | 6/1999 | Mutsuga et al. | .............. | 701/200 |
| 5,928,307 A * | 7/1999 | Oshizawa et al. | ............. | 701/210 |
| 5,931,888 A * | 8/1999 | Hiyokawa | ...................... | 701/208 |
| 6,034,626 A * | 3/2000 | Maekawa et al. | ......... | 340/995.21 |
| 6,253,146 B1 * | 6/2001 | Hanson et al. | ................. | 701/202 |
| 6,253,151 B1 * | 6/2001 | Ohler et al. | ..................... | 701/208 |
| 6,317,685 B1 * | 11/2001 | Kozak et al. | ................... | 701/210 |
| 6,321,161 B1 * | 11/2001 | Herbst et al. | .................. | 701/210 |
| 6,427,119 B1 * | 7/2002 | Stefan et al. | ................... | 701/209 |
| 6,456,934 B1 * | 9/2002 | Matsunaga et al. | ........... | 701/210 |
| 7,680,596 B2 * | 3/2010 | Uyeki et al. | .................... | 701/210 |
| 7,742,873 B2 * | 6/2010 | Agnew et al. | .................. | 701/209 |
| 2001/0029425 A1 * | 10/2001 | Myr | ............................. | 701/200 |
| 2002/0077116 A1 * | 6/2002 | Havinis et al. | ................. | 455/456 |
| 2002/0082771 A1 * | 6/2002 | Anderson | ...................... | 701/209 |
| 2002/0128773 A1 * | 9/2002 | Chowanic et al. | ............ | 701/210 |
| 2003/0187573 A1 * | 10/2003 | Agnew et al. | .................. | 701/201 |
| 2004/0010366 A1 * | 1/2004 | Videtich | ........................ | 701/210 |
| 2004/0119612 A1 * | 6/2004 | Chen | ......................... | 340/995.13 |
| 2004/0150534 A1 * | 8/2004 | Linn | .............................. | 340/995.13 |
| 2005/0102099 A1 * | 5/2005 | Linn | .............................. | 701/209 |
| 2005/0159889 A1 * | 7/2005 | Isaac | .............................. | 701/210 |
| 2005/0222764 A1 * | 10/2005 | Uyeki et al. | .................... | 701/210 |
| 2008/0109162 A1 * | 5/2008 | Chen et al. | ..................... | 701/210 |

* cited by examiner

Primary Examiner — Bhavesh V Amin
(74) Attorney, Agent, or Firm — Leydig, Voit & Mayer, Ltd

(57) ABSTRACT

A navigation server as part of a vehicle navigation system provides a set of turn-by-turn directions to a vehicle driver from the vehicle's current location to a destination chosen by the driver. Further, a navigation server receives new route requests because a vehicle driver disregards a previous a maneuver contained in a previous set of turn-by-turn directions. The navigation server tracks vehicle locations whereat new routes have been requested. If a large number of new route requests occur in a given location, the system analyzes this location to determine whether the location is one where poor directions are given. Improved directions may thus be generated and provided.

13 Claims, 6 Drawing Sheets

METHOD AND SYSTEM OF USING TURN-BY-TURN SERVER BASED REROUTES DATA TO IMPROVE A NAVIGATION USER INTERFACE

FIELD OF THE INVENTION

The present disclosure relates generally to technologies for providing turn-by-turn vehicle navigation guidance, and more particularly to a system employing server-based reroutes data to improve a navigation user interface.

BACKGROUND OF THE INVENTION

Drivers use in-vehicle navigation systems to provide turn-by-turn directions. An in-vehicle navigation system may be contained in a telematics unit of a vehicle which may be part of a larger vehicle navigation system offered by a telematics service provider and/or others. Currently, a vehicle driver may call a telematics advisor to request turn-by-turn directions from her current location to a destination. An advisor enters the destination into a vehicle navigation system which also receives the vehicle's current location from the vehicle's telematics unit. At this point, a navigation server compiles a route from the vehicle's current location to a destination and compiles a set of turn-by-turn directions. The navigation server sends the set of turn-by-turn directions to the in-vehicle navigation system across a wireless link. A vehicle driver receives turn-by-turn directions through an audio or electronic user interface of the in-vehicle navigation system.

On occasion, a driver may miss or disregard a maneuver included in a set of turn-by-turn directions compiled by a navigation server. There are many causes for such deviation from the given directions. For example, road closures, traffic congestion, driver preference for alternate route, and poor directions may cause such deviations. After a driver misses or disregards a maneuver (both cases hereinafter referred to as "disregard") within a set of turn-by-turn directions, the in-vehicle navigation system may query the vehicle driver whether she would like a new set of turn-by-turn directions from the vehicle's current location. If the driver so desires, the navigation system may query the navigation server to provide a new set of turn-by-turn directions from the vehicle's current location. This new route request includes the vehicle location so that the navigation server can generate the new set of turn-by-turn directions and send them to the in-vehicle navigation system. However, such systems have not been able to fully and efficiently meet re-routing needs in every case, and thus, a new system is need for remedying shortcomings of prior systems in this regard as well as others.

BRIEF SUMMARY OF THE INVENTION

A navigation server that is part of a vehicle navigation system provides a set of turn-by-turn directions to a vehicle driver from the vehicle's current location to the destination chosen by the driver. Further, the navigation server receives new route requests when a vehicle driver disregards one or more maneuvers contained in the set of turn-by-turn directions, whether the maneuver is missed because of road closure, traffic congestion, driver preference for alternate route, and poor directions. Over a period of time, the navigation server compiles a number of vehicle locations where new routes have been requested. Although it may be difficult to assess the reason for a new route request from any single request from a certain location, if a large number of new route requests occur in the same location, then it is likely that there is a common reason for the vehicle drivers to disregard the directions and query new route requests.

Aspects of the disclosure determine the location where a large number of new routes have been requested. Further, aspects of the disclosure analyze this location to eliminate the location if there is a road closure or high traffic congestion and to determine whether the candidate location is one where poor directions are given. A development team skilled in the art of turn-by-turn directions analyzes the candidate locations and enters improved directions in the navigation server to improve future turn-by-turn directions for the locations.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
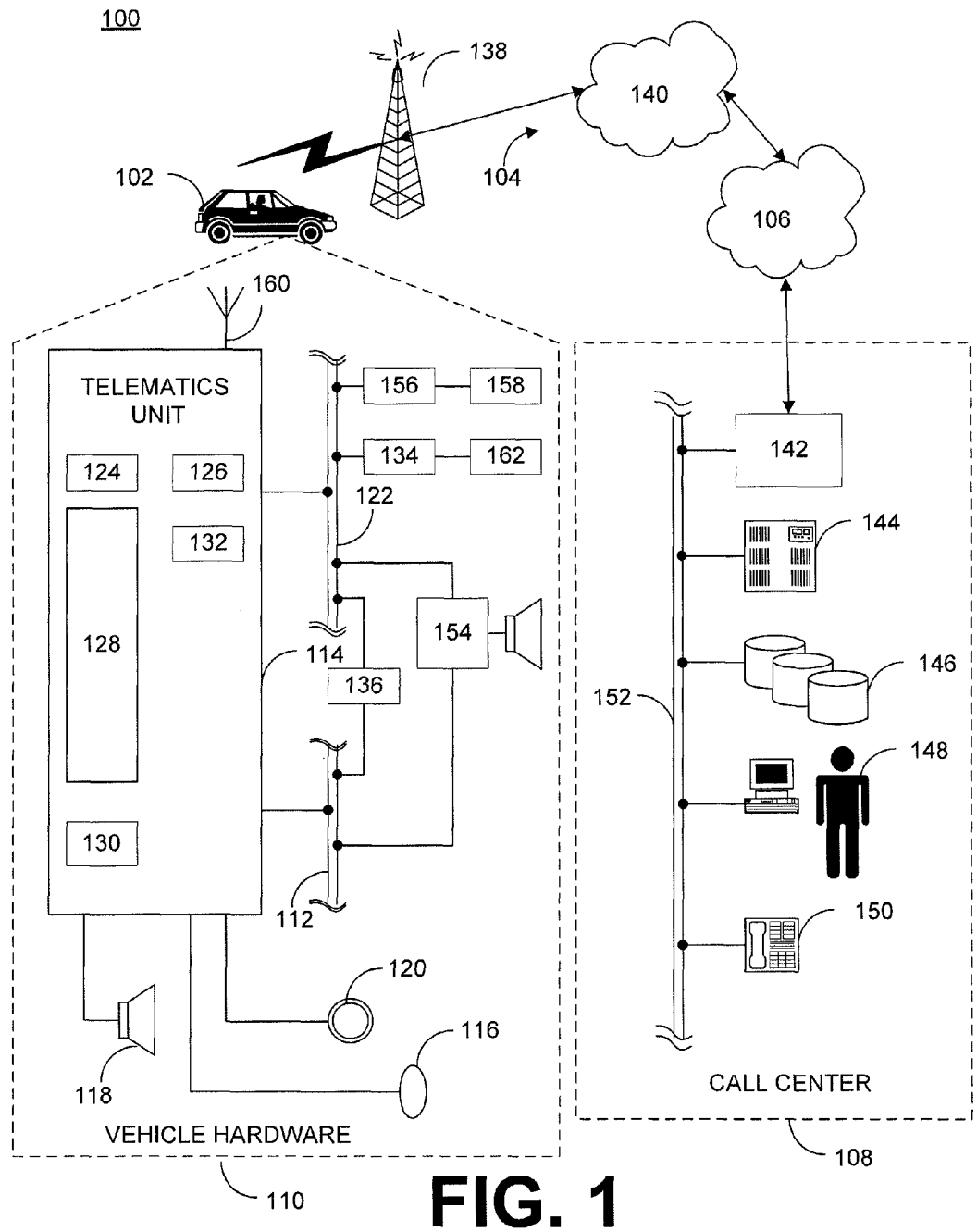
FIG. 1 is a schematic view of an example communication system within which examples of the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

A vehicle driver may request turn-by-turn directions from an in-vehicle navigation that is part of a telematics unit. The in-vehicle navigation system contains a user interface that may be, but is not necessarily limited to, an audio output or a video display. The in-vehicle navigation system is part of the vehicle navigation system that is offered by a telematics service provider. The vehicle navigation system includes a navigation server that provides a set of turn-by-turn directions to a vehicle driver through the in-vehicle navigation system after receiving a route request from the vehicle driver. Further, the navigation server may receive new route requests while the driver is traveling along the route because the vehicle driver may disregard a maneuver contained in a previous set of turn-by-turn directions. Over a period of time, the navigation server compiles a number of vehicle locations where new routes have been requested. Although it may be difficult to assess the reason for a new route request from any single request from a certain location, e.g., whether it is due to driver error or bad directions, if a large number of new route requests occur in the same location, then it is likely that there is a common reason for the new route requests.

Figure 2:
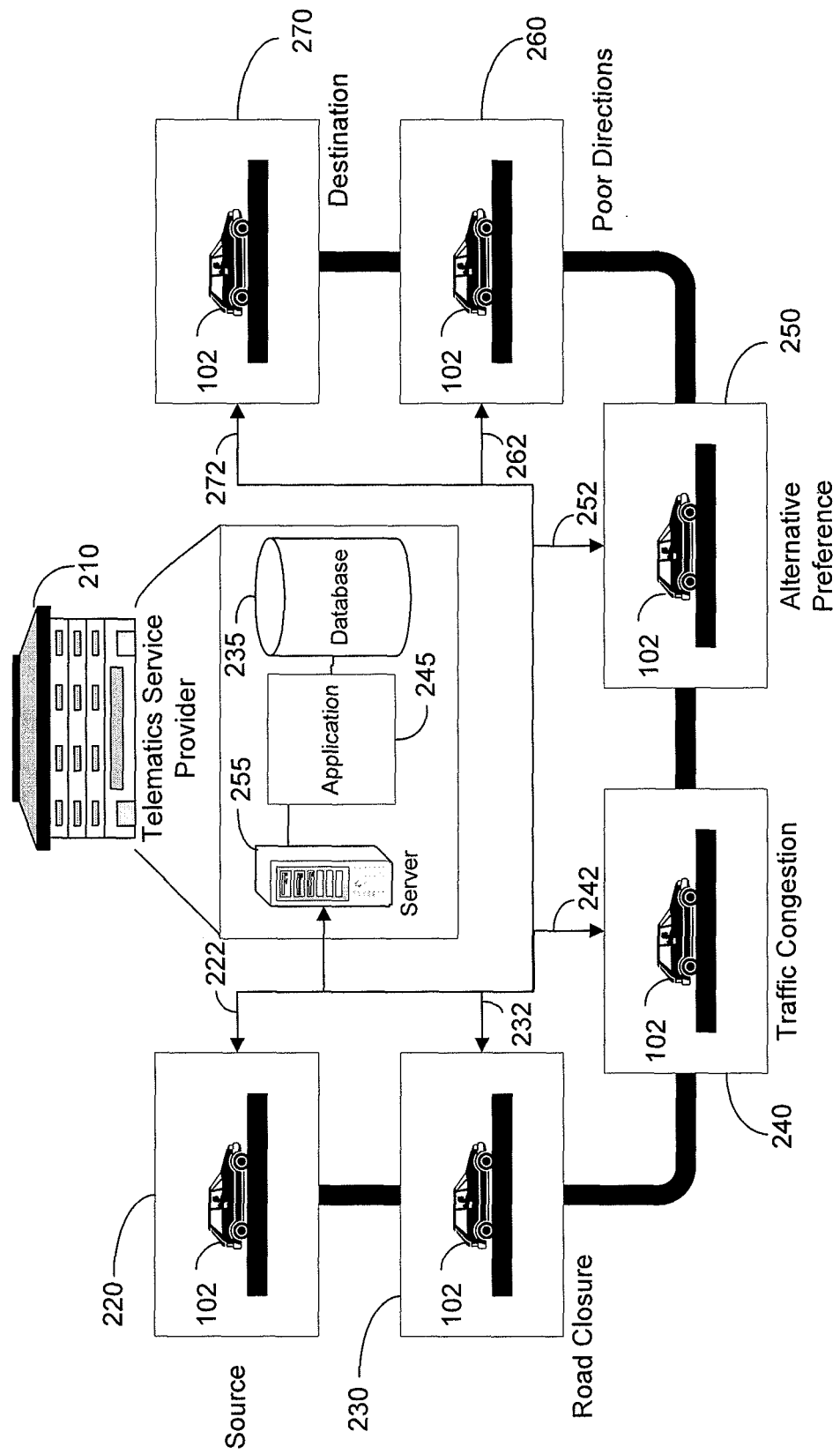
FIG. 2 is a schematic view of an exemplary system architecture in keeping with the disclosed principles.

FIG. 2 is a schematic view of exemplary system architecture in keeping with the disclosed principles. FIG. 2 illustrates that a vehicle driver 102 enters a destination from a source location into a vehicle's navigation system which then transmits the destination and vehicle's current location across a wireless link 222 to a navigation server 255 located on a telematics service provider premises. The navigation server 255 and one or more software applications 245 access one or more databases 235 to retrieve and compile a first set of turn-by-turn directions to send to the vehicle driver across a wireless link 222. At a second location 230 a vehicle driver 102 may disregard a maneuver in the first set of turn-by-turn directions. This may be, for example, due to a road closure. The vehicle driver may send a new route request from this road closure location 230 to the navigation server 255 across a wireless link 232. The navigation server 255 and software applications 245 access one or more of the databases 235 to retrieve, compile, and send a second set of turn-by-turn directions to the vehicle driver across a wireless link 232. It will be appreciated that the vehicle driver may disregard several subsequent maneuvers contained in different sets of turn-by-turn directions at different locations (240, 250, and 260). This could be for many different reasons such as traffic congestion 240 and an alternate route preference (e.g. scenic route) 250, or because of poor turn-by-turn directions 260.

Figure 3:
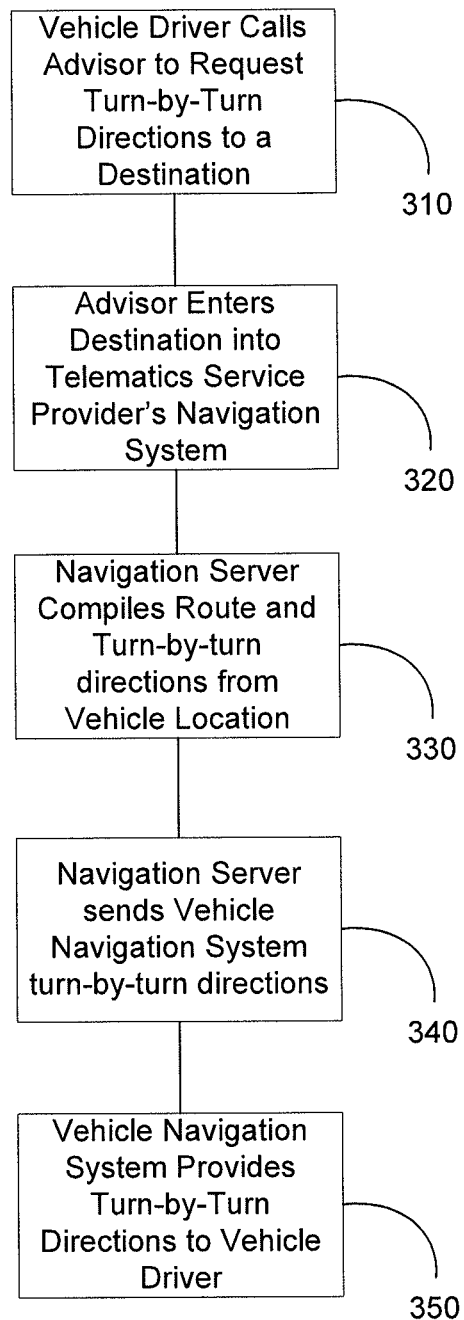
FIGS. 3-5 are flow diagrams that illustrate exemplary aspects of a method of using turn-by-turn server based reroutes data to improve a navigation user interface according to an aspect of the invention.
Figure 4:
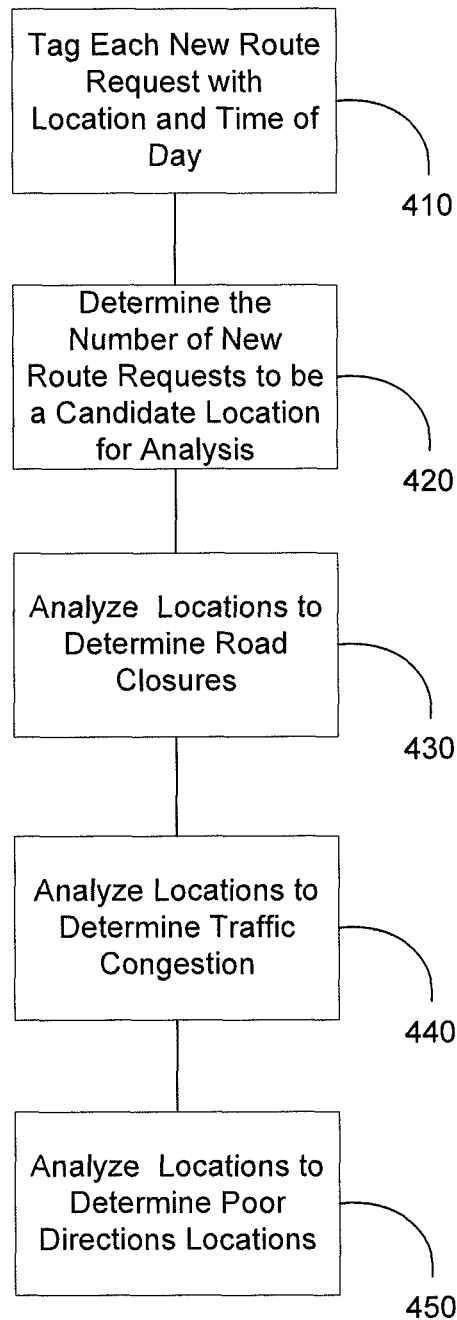
Figure 5:
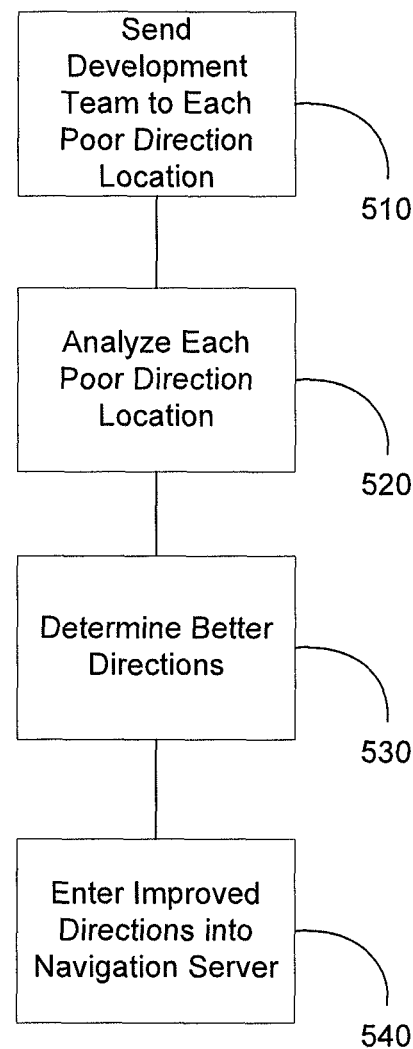

FIGS. 3-5 are flow diagrams that illustrate exemplary aspects of a method of using turn-by-turn server based reroutes data to improve a navigation user interface according to an aspect of the invention. When a vehicle driver travels from a current location to a destination as shown in FIG. 2, the driver may call an advisor employed by a telematics service provider to request turn-by-turn directions to a destination at step 310. At step 320, the advisor enters the destination of the route request into the telematics service provider's vehicle navigation system. The vehicle navigation system acquires the current location of the vehicle from the in-vehicle navigation system that is part of the telematics unit. For example, the telematics unit may use a GPS device or function to determine the vehicle's current location, and may then transmit the determined location to the navigation server in the route request.

At step 330, the navigation server compiles the route and turn-by-turn directions from the vehicle's current location. At step 340, the navigation server within the telematics service provider's navigation system sends to the in-vehicle navigation system a set of turn-by-turn directions. At step 350, the in-vehicle navigation system provides the turn-by turn directions to the driver. The directions are provided through a user interface that may be or comprise, but is not limited to, an audio output and/or a video display.

If the vehicle driver disregards a maneuver in the set of turn-by-turn directions, the vehicle's telematics unit may query the driver as to whether he or she needs new directions from the vehicle's current location to the destination. If the driver does want a new set of turn-by-turn directions, then a new route request is generated by the vehicle's navigation system, wherein the new route request contains the vehicle's current location. The new route request is sent to the navigation server.

FIG. 4 is a further flow diagram illustrating another aspect of the invention. At step 410, the in-vehicle navigation system tags each new route request with a current location of the vehicle and the day, time of day, and date of the request. For example, as mentioned above by reference to FIG. 2, the telematics unit may use a GPS to determine the vehicle's current location and transmit an indicator of the location to the navigation server in the route request. At step 420, the navigation server determines a number of new route requests for a given location that make the location a candidate location for analysis. For example, the telematics service provider may set a threshold of 100 new route requests every weekday during a month, beyond which a location is a candidate for analysis.

At step 430, the navigation server analyzes the candidate locations (using at least one software application) to determine whether the large number of new route requests is due to a road closure. This determination is made, for example, by comparing the date, day of week, and time of day of each new route request and comparing it to road closure information distributed to telematics service providers by traffic providers. For example, if the location corresponding to the corner of Main Street and Elm Street generates more than the threshold number of new route requests during a measurement interval, then the navigation server may examine traffic reports offered by a traffic provider for this corner. Thereafter, the navigation server determines that Main Street has been closed at that corner for the month resulting in a large number of new route requests from that location.

At step 440, the navigation server analyzes candidate locations to determine whether the large number of new route requests is due to traffic congestion. This determination is also made by comparing the date, day of week, and time of each new route request to traffic congestion information distributed by traffic providers. For example, a location corresponding to exit 400 on Highway 5 generates over 100 new route requests during a month. A navigation server analyzes the new route requests from that location to determine that most new route requests are made during rush hour because there is a large industrial complex nearby. Workers traveling to and from the large industrial complex create high traffic congestion at the location resulting in the generation of a large number of new route requests. At step 450, the navigation server analyzes candidate locations to determine whether the large number of new route requests is due to poor directions. This analysis, performed by at least one software application, is executed in order to eliminate other reasons for the large number of new route requests.

FIG. 5 is a flow diagram illustrating a further aspect of the invention. At step 510, the telematics service provider dispatches a development team skilled in the art of turn-by-turn directions to each candidate location. At step 520, the development team analyzes each poor direction location. At step 530, the development team determines whether there is a need for improved directions, and if so, determines improved directions for that location.

Figure 6:
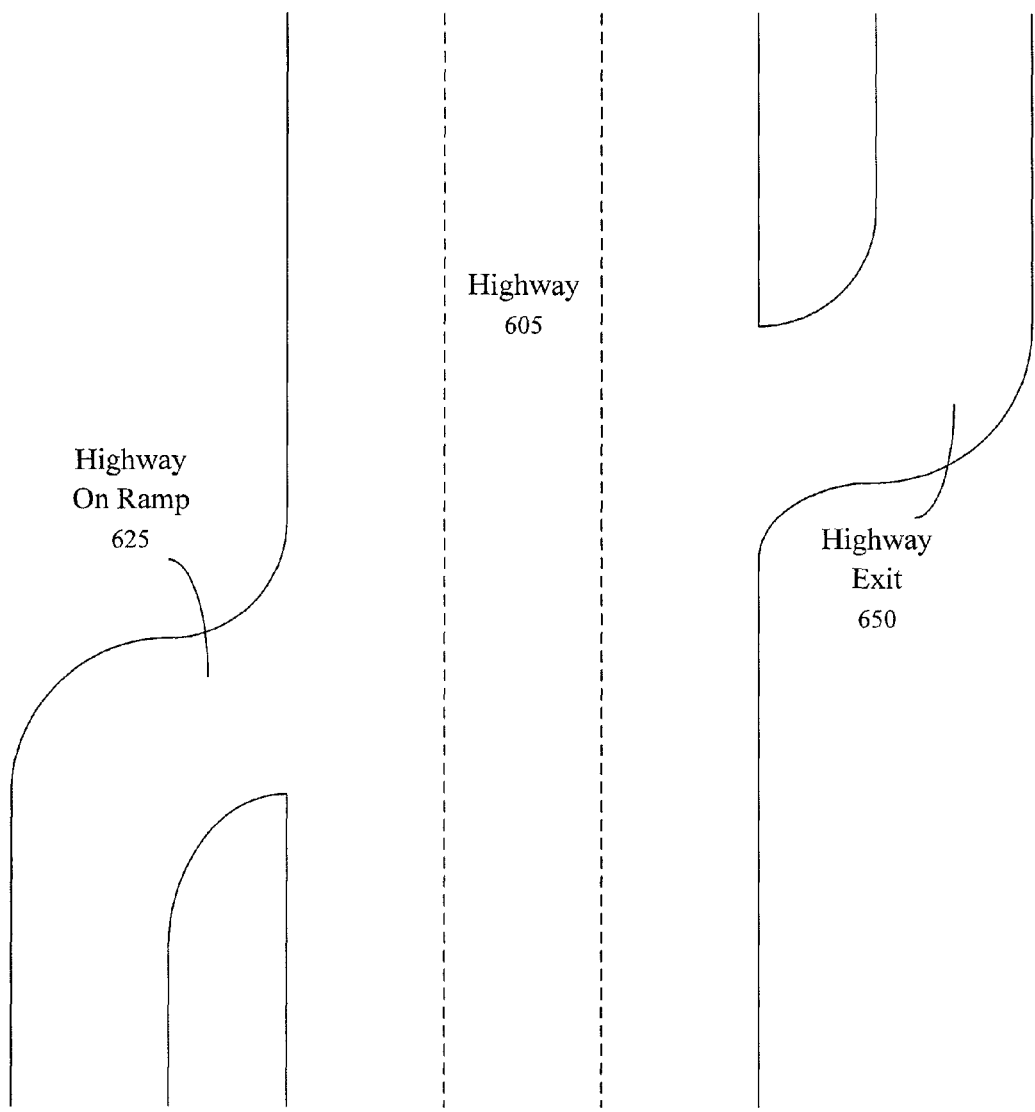
FIG. 6 is a highway diagram that illustrates an exemplary location from where navigation system provides poor directions.

FIG. 6 illustrates an exemplary location for which a vehicle navigation system provides poor directions. For example, the location may include a highway on-ramp 625 that enters a left lane of a highway 605, in addition to an exit 650 that is within 500 feet and must be taken from the right lane of the highway. The development team may warn a vehicle driver in a future set of directions that the exit 650 approaches quickly when entering the highway on-ramp 625. Consequently, the driver needs to take the approaching exit 650 quickly and move all the way to right lane of the highway. This maneuver reduces the likelihood that a vehicle driver may disregard an exit maneuver due to poor turn-by-turn directions.

Another instance where directions can be improved involves situations wherein directions are given too quickly for a driver to react and make the necessary turns on a route. Further, the geometry of the roads (e.g. roundabout) may require improved directions for a location. Development teams analyze the location for these and other causes and improve the turn-by-turn directions of the location for future route requests. Referring back to FIG. 5, at step 540, once the development team determines the improved set of turn-by-turn directions for the poor direction location, the development team enters the new directions into the navigation server for future use.

It will be appreciated that a new system for turn-by-turn direction improvement has been disclosed and described herein. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred examples of this invention are described herein, including the best mode known to the inventors for carrying out the invention. Variations of those preferred examples may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of improving turn-by-turn directions in a vehicle navigation system using new route requests, the method comprising:
   providing turn-by-turn directions from a navigation server to a vehicle telematics unit via a wireless communication network;
   receiving at the navigation server from the vehicle telematics unit over the wireless communication network a new route request indicating that the vehicle has deviated from the provided turn-by-turn directions, wherein the new route request includes a current vehicle location and date stamp;
   determining whether a total number of new route requests received from the location identified in the new route request exceeds a predetermined threshold number; and
   if the number of new route requests exceeds the predetermined threshold number, flagging the vehicle location as a candidate location for direction improvement.

2. The method of improving turn-by-turn directions according to claim 1, the method further comprising:
   analyzing the candidate location for poor directions to determine an improved set of turn-by-turn directions for the candidate location for the poor directions; and
   storing the improved set of turn-by-turn directions in the navigation server.

3. The method of improving turn-by-turn directions according to claim 1, wherein the date stamp comprises a day of the week, a time of day, and a date.

4. The method of improving turn-by-turn directions according to claim 1, wherein the telematics unit includes an in-vehicle navigation system.

5. The method of improving turn-by-turn directions according to claim 4, wherein the in-vehicle navigation system includes a user interface comprising at least one of an audio interface and a video interface.

6. The method of improving turn-by-turn directions according to claim 1, wherein the wireless communication network includes one of a wireless wide area network, a wireless metropolitan area network, a wireless local area network, a CDMA2000 network, an Evolution Data Optimized (EVDO) network, a High Speed Downlink Packet Access (HSDPA) network, a GSM network, a WiFi network, and a WiMAX network.

7. A system of using new route requests to improve turn-by-turn directions, the system comprising;
   a navigation server for receiving a new route across a wireless network from a an in-vehicle navigation system, the new route request being indicative of the in-vehicle navigation system having deviated from a previously provided set of turn-by-turn directions;
   an application at the navigation server that analyzes a plurality of new route requests at the navigation server for determining whether the new route request causes the number of new route requests received from the same location to exceed a predetermined threshold and, if so, for creating an improved set of turn-by-turn directions about the location; and a database accessible to the navigation server to store the improved set of turn-by-turn directions about the location.

8. The system according to claim 7, wherein each new route request includes a current vehicle location and a date stamp.

9. The system according to claim 7, wherein the navigation server selects the threshold for the number of new route requests for a vehicle location.

10. The system according to claim 7, wherein the navigation server is further adapted to provide the improved set of turn-by-turn directions for the candidate location in response to any request for turn-by-turn directions covering a route that contains the candidate location.

11. The system of according to claim 7, wherein the wireless communication network includes one of a wireless wide area network, a wireless metropolitan area network, a wireless local area network, a CDMA2000 network, an Evolution Data Optimized (EVDO) network, a High Speed Downlink Packet Access (HSDPA) network, a GSM network, a WiFi network, and a WiMAX network.

12. The system according to claim 8, wherein the date stamp comprises a day of the week, a time of day, and a date.

13. The method of improving turn-by-turn directions according to claim 2, further comprising:

receiving another request for turn-by-turn directions from another vehicle telematics unit for a route from a first location to a second location, the other request for turn-by-turn directions having a location stamp different from the location stamp of the new route request but wherein the route from the first location to the second location includes the location from which the new route request was sent; and in response to the other request for turn-by-turn directions, providing the improved set of turn-by-turn directions within a set of turn-by-turn directions to travel from the first location to the second location.

* * * * *